May 7, 1968  H. C. DONOIAN ET AL  3,382,183
PLASTIC OPTICAL FILTER
Filed Sept. 2, 1965  3 Sheets-Sheet 1

INVENTORS.
PETER V. SUSI
HAIG C. DONOIAN
BY Philip Mintz
ATTORNEY

3,382,183
PLASTIC OPTICAL FILTER

Haig C. Donoian, Chelmsford, Mass., and Peter V. Susi, Middlesex, N.J., assignors to American Cyanamid Company, Stamford, Conn., a corporation of Maine
Continuation-in-part of application Ser. No. 235,494, Nov. 5, 1962. This application Sept. 2, 1965, Ser. No. 484,562
5 Claims. (Cl. 252—300)

ABSTRACT OF THE DISCLOSURE

An optical filter comprising an organic plastic substrate having dispersed therein (a) an organic infrared absorbing compound, such as a vinylcarbonium compound, a manganese complex of a nitrosophenol, a fluorenol salt, a bis(xanthene) heptamethine salt or a tris(p-dialkylaminophenyl) aminium salt and (b) an ultraviolet light absorbing compound, such as an o-hydroxybenzophenone, an o-hydroxyphenylbenzotriazole, a salicylic acid ester, a substituted acrylonitrile, a substituted arylaminoethylene, an o-hydroxyphenyltriazine or a nitrilohydrazone; a typical specific combination of compounds being tris(p-diethylaminophenyl) aminium fluorborate and 2,2'-dihydroxy-4-methoxybenzophenone.

---

Figure 1:
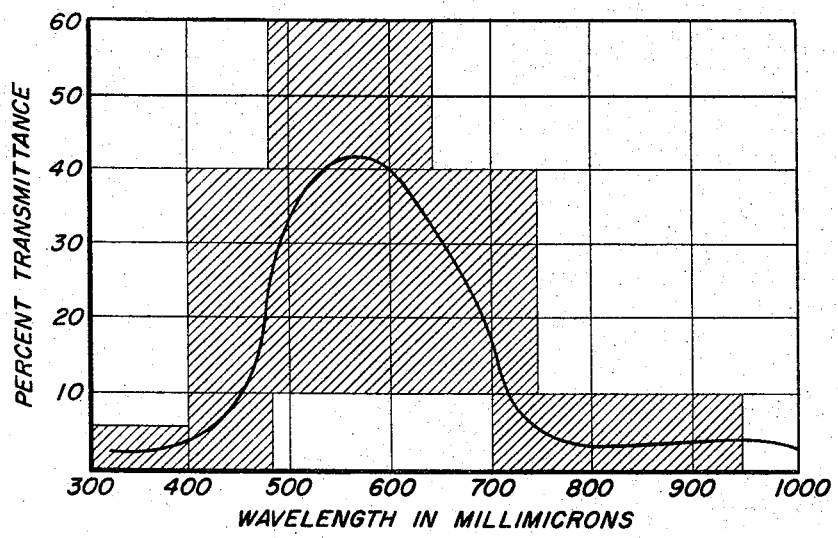

This is a continuation-in-part of application Ser. No. 235,494, filed Nov. 5, 1962, now abandoned.

This invention relates to optical filter systems. More particularly, it relates to such systems wherein an organic plastic substrate has dispersed therein an organic infrared absorber and an organic ultraviolet absorber to provide a certain defined radiant energy transmission spectrum so that the optical filter system upon exposure to sunlight will have a relatively long useful life transmitting visible radiation while absorbing infrared radiation before excessive degradation of the organic infrared absorber has occurred.

Suitable optical filtering systems are essential for various purposes. One very important use is as a protective light transmitting medium or barrier such as a lens material or screen. Such a material must filter out or absorb invisible but harmful radiation such as the near infrared components of the incident radiation. Nevertheless, it must permit adequate transmittance of the visible components of the incident radiation. Additionally, to be commercially useful, such a material must have an adequately long service life before excessive degradation of the components thereof by the incident radiation. Such radiation may be that found in artificial light from various sources or that in normal sunlight. Since sunlight presents all the typical problems it will be used as the principal illustration.

Among the many practical applications of such optical filters may be mentioned sunglasses, welders' goggles, protective filters, windows, windshields, canopies, television filters, projection lenses and the like. In many, if not most, of such uses the primary object is to protect the human eye from the adverse effects of incident radiation. Accordingly, since sunlight is being primarily considered as the illustrative source of the radiation, for purposes of this discussion sunglasses will be taken as the principal illustrative usage.

Optical filter systems suitable for protecting the eye must be capable of meeting certain criteria. With glass as the substrate, suitable optical filters are relatively easy to achieve. Glass of most types is substantially opaque to ultraviolet radiation shorter than about 0.35 micron and to infrared radiation longer than about five microns.

Nevertheless, even when glass can be used, it must be modified, particularly to decrease transmittance of infrared radiation at from about 0.7 to about 5.0 microns. Various additives have been developed for this purpose, the most usual being metallic oxides or salts such as ferrous oxide and ferric or ferrous salts. Obviously, when it is necessary or desirable to use an organic plastic substrate which transmits well in the visible region, such additives as are suitable for glass cannot be employed. As will be described later, organic infrared absorbers have been developed which are suitable for incorporation in organic plastic substrates.

Radiant energy from the sun is frequently grouped into three regions, the near ultraviolet, the visible and the near infrared. Together these three regions cover the range of wavelengths from 0.290 micron to about 5.0 microns. Somewhat arbitrarily, the near ultraviolet spectrum is often considered to cover the region of 0.300–0.400 micron; the visible spectrum, the region of 0.400–0.700 micron; and the near infrared spectrum the region of 0.700–5.0 microns.

Distribution of radiant energy in these ranges is shown in the following table for a number of common sources of radiant energy.

TABLE I.—APPROXIMATE DISTRIBUTION OF RADIANT ENERGY FROM SEVERAL ENERGY SOURCES

| | Percent of Total Radiant Energy Emitted | | | |
|---|---|---|---|---|
| | .3–.4µ | .4–.7µ | .6–1.6µ | Above .7µ |
| Sunlight (reaching earth) | 5 | 42 | 54 | 53 |
| Tungsten Lamp, 500 w | 0.1 | 10 | 53 | 90 |
| Fluorescent Lamp | 5 | 35 | 28 | 60 |
| Carbon Filament Heater | 0 | 1 | 28 | 99 |
| Non-luminous Heater | 0 | 0 | 1.3 | 100 |

From these figures it can be seen that sunlight, for example, contains a small but definite proportion of radiation in the near ultraviolet region. We have discovered that exposure to this small amount of ultraviolet radiation is the principal cause of degradation of organic infrared absorbers. Experience has shown that an adequate protective filter should not transmit more than five percent of incident radiation between about 0.3 and 0.4 micron. In this region, the filter system should serve as a barrier to at least 95% and preferably about 97% or more of incident radiation in this range, both at any particular wave length and as to the total incident radiant energy.

The amount of transmitted energy is thus some three to five percent. Accordingly, in this discussion the term "transmittance" is used to mean the ratio of transmitted energy to incident energy. For convenience it is expressed in percentage.

Requirements as to the visible region may vary with special requirements. As noted above, this region is usually defined as from about 0.4 to about 0.7 micron. However, in the present invention particular consideration must be given to the region between about 0.4 and about 0.48 micron and that between about 0.65 and 0.75 micron. Accordingly, for present purposes, the visible portion will be considered as from about 0.40 to about 0.75 micron, divided into the three zones:

(a) from about 0.40 to about 0.48;
(b) from about 0.48 to about 0.65; and
(c) from about 0.65 to about 0.75 micron.

A suitable filter for the present purposes should transmit less than 40% of any radiation at a wavelength in zone (a). This is necessary to insure an adequate barrier to harmful radiation of relatively short wavelengths just above the usual arbitrary termination of the near ultraviolet at about 0.40 micron.

In zone (b), however, higher transmittance is desirable. In general, transmittance should be at least 10% at wavelengths in this zone. While maximum requirements may vary, for use in the illustrative sunglasses, transmittance in this region in general should be less than about 60%. In many cases it is usually much lower, about 45% or less. Modern sunglasses, for example, often transmit as little as 10 to 20%.

Zone (c) will be discussed below in more detail in conjunction with the near infrared region.

Heat from the sun is essentially due to the near infrared radiant energy. Other high temperature bodies, such as tungsten filaments, fluorescent lamps, carbon arcs, etc., also radiate energy in the near infrared region, as noted above for practical purposes this often is defined as falling between 0.7 and 5.0 microns, this being the region where common sources of infrared radiation emit substantially all of their infrared energy. As shown above in Table I, over half of the total radiation energy emitted by the sun or electrical lamps is in the near infrared region. The distribution for sunlight is shown in more detail in the following Table II.

TABLE II.—APPROXIMATE DISTRIBUTION OF RADIANT ENERGY OF SUNLIGHT

| Region | Percent of Total | Percent of Infrared |
|---|---|---|
| 0.3–0.4μ | 5 | |
| 0.4–0.7μ | 42 | |
| 0.7–1.0μ | 23 | 43.5 |
| 1.0–1.3μ | 12 | 22.5 |
| 1.3–1.6μ | 4.5 | 8.5 |
| 1.6–1.9μ | 4.5 | 8.5 |
| 1.9–2.7μ | 5 | 9.5 |
| 2.7–up μ | 4 | 7.5 |

Tables I and II indicate that within the near infrared region, the greater part of the energy is radiated within the region between wavelengths of about 0.7 and about 2.0 microns. For example, in normal sunlight some two-thirds of the total radiant energy is in the region from about 0.7 to about 1.3 microns. Accordingly, a large proportion of the total radiant energy emitted by our common light sources serves no useful purpose with respect to illumination, but contributes to development of heat in the material receiving the radiation.

It also may be noted in Table II that some 43–44% of the total infrared radiation in sunlight is in the region just above about 0.7 micron. The latter is about the upper limit of the visible range which, as noted above, usually is defined as from about 0.4 to about 0.7 micron, hence the "near" infrared designation. While by definition the near infrared region extends only down to about 0.7 micron, for purposes of this invention, the region of particular interest extends from about 0.65 micron to about 0.95 micron.

There are many potential applications for materials that will transmit a major portion of the visible radiations but at the same time be at least semi-opaque to heat-producing infrared radiation, particularly that in the above-noted region of from about 0.65 to about 0.95 micron. However, to provide adequate protection for the human eye, transmittance should be less than forty percent at from about 0.65 to about 0.75 micron and not over about ten percent between about 0.75 and about 0.95 micron.

Other protective optical filters may vary as to requirements in the visible range. In most cases, however, transmittance in the near infrared should not exceed the indicated limitations. This applies, for example, not only to other eye protective devices as widely different as welders' goggles and window glass, but also to protecting inanimate material as in the case of projection lenses. Optimum protective utility, therefore, ordinarily requires relatively good transmittance of radiation below about 0.65 micron but reduced or minimized transmittance above that value. Obviously complete cutoff at exactly this, or any other wavelength, is impossible. Nevertheless, for the purposes of this invention, cutoff should be as sharp as possible within a minimum spread of wavelength at about 0.7 micron.

The foregoing limitations may be summarized as follows. Transmittance of radiant energy of various wavelengths occurring in sunlight or other light sources should be:

less than 5% at 400 mμ and below to 300;
less than 40% from 400 to 480 mμ;
more than 10% and less than 60% from 480 to 650 mμ;
less than 40% from 650 to 750 mμ; and
less than 10% from 750 to 950 mμ.

In addition, certain other requirements are generally applicable to suitable eye protective filters. These apply more particularly to the substrate. Before inclusion of the protective agents, it should transmit at least about eighty percent of the incident energy in the visible range. With or without the protective agents it should have good optical properties. Haze should not be excessive. It should not distort vision therethrough sufficiently to unduly affect the desired resolution. Finally, the desired degree of protection should be obtainable in a substrate layer of reasonable thickness, for example in sunglasses usually less than about five mm. Last, but not least, the degree of protection offered must be effective over a satisfactorily long service life.

Plastic eye protection filters are highly desirable because plastic materials are light in weight, nonbreakable and economical. In the past, no combination of an organic plastic substrate with compatible protective agents dispersed therein has been available which meets these requirements. Particularly is this true as to meeting the combination of transmittance requirements set forth above and to retaining such properties for the desired period. It is, therefore, the primary object of this invention to provide such a combination of a suitable plastic substrate and protective agents.

It is known that organic infrared absorbers are degraded upon prolonged exposure to sunlight. Since the infrared absorber is protecting something else from the deleterious effects of the infrared radiation by absorbing this radiation itself, it would seem apparent that the degradation of the infrared absorber with time is due to the ravages of the infrared radiation, and, therefore, it would not be possible to protect these organic infrared absorbers so as to extend their useful lives.

The degradation of organic infrared absorbers upon exposure to sunlight is observed as a darkening of the plastic substrate, i.e. a loss of transmittance in the visible range takes place. There may also be a loss of infrared absorbing power, particularly after prolonged exposure.

The present invention arises from the striking and unexpected discovery that these organic infrared absorbers also absorb a very small amount of ultraviolet radiation and that it is this small amount of ultraviolet radiation which degrades the infrared absorber, not the massive amounts of infrared radiation being absorbed. As a consequence of this unexpected discovery, a way has been found to protect and preserve the infrared absorbers, viz., by incorporating ultraviolet absorbers with them in the organic plastic substrate.

Thus, the present invention relates to an optical filter system which contains therein an organic plastic substrate, sufficient organic infrared absorber to produce certain desirable spectral characteristics, and sufficient organic ultraviolet absorber to protect the infrared absorber and greatly extend its useful life.

In view of the foregoing discussion, this invention will be more fully described by consideration of (a) the substrate; (b) the infrared region; (c) the ultraviolet region; and (d) the visible region. The invention will also be illustrated in conjunction with the accompanying drawings in which:

FIGURE 1 is a plot in which the shaded area shows the preferred transmittance limits of incident energy at various portions of the spectrum and superimposed thereon a typical transmittance curve for an optical filter meeting the above-noted requirements; and FIGURES 2 to 5, inclusive, are similar plots showing transmittance curves of optical filter systems produced in accordance with the examples shown below.

THE SUBSTRATE

Various organic plastic substrates are available having generally suitable transmittance properties in the visible region. Illustrative examples include:

cellulose derivatives such as cellulose nitrate, cellulose acetate and the like; regenerated cellulose and cellulose ethers as for example, ethyl and methyl cellulose;

polystyrene plastics such as polystyrene per se and polymers and copolymers of various ring-substituted styrenes such for example as o-, m- and p-methylstyrene and other ring-substituted styrenes as well as side-chain substituted styrenes such as alpha-, methyl- and ethylstyrene and various other polymerizable and copolymerizable vinylidenes;

various vinyl polymers and copolymers such as polyvinyl butyral and other acetals, polyvinyl chloride, polyvinyl acetate and its hydrolysis products, polyvinyl chloride-acetate copolymers and the like;

various acrylic resins such as polymers and copolymers of methyl acrylate, methyl methacrylate, acrylamide, methylolacrylamide, acrylonitrile and the like;

polyolefins such as polyethylene, polypropylene and the like;

polyesters and unsaturated-modified polyester resins such as those made by condensation of polycarboxylic acids with polyhydric phenols, or modified using unsaturated carboxylic acid and further modified by reacting the alkyd with another monomer;

polymers of allyl digylcol carbonate; and various copolymers using as a cross-linking monomer an allyl ester of various acids. Of particular interest and preferred herein as substrates are cellulose acetate, polymethyl methacrylate, polystyrenes and polymers of allyl digylcol carbonates.

Any one such substrate may, and usually does, vary from others very appreciably in its transmittance of radiant energy at various wavelengths. Nevertheless, if not modified, none meet the foregoing transmittance requirements. Additives are necessary to effectively decrease the ultraviolet and infrared transmittance without adversely affecting transmittance in the visible range.

Organic substances used to impart desired absorbing characteristics to the plastic substrate must be compatible with the substrate to achieve the desired effect. In most instances it is necessary to use a combination of materials. Although a single material in the proper concentration may result in absorption in one range of wavelengths, for example in the infrared, it is usually necessary to use a different material to get the desired transmittance in some other range or ranges.

THE INFRARED RANGE

Various types of compounds are known to absorb in the infrared region. Some may be used alone or in combination in the optical filter systems of the present invention. Illustrative examples of some types of compounds which may be used include substituted vinyl-carbonium compounds (U.S. Patent No. 2,813,802); manganese complexes of nitrosophenols (U.S. Patent No. 2,971,921); salts of certain fluorenols (U.S. Patent No. 3,000,833); and certain bis(xanthene) heptamethine salts, Wizinger et al., Ber. 92, 2309 (1959). However, use of these materials alone in a substrate of this invention will not necessarily produce the absorption noted above for eye protection against infrared radiation. In general, too, in use under such circumstances they do not continue to afford protection for the desired service period.

Accordingly, preparation of optical filter systems of this invention may be illustrated most conveniently by our preferred utilization of certain tris(p-dialkylaminophenyl)aminium salts which are not subject to all these defects. Such salts form, in part, the subject matter of a copending application, Ser. No. 215,791, filed Aug. 9, 1962 by P. V. Susi et al., now abandoned.

Therein, are shown certain tris(p-dialkylaminophenyl) aminium salts represented by the formula

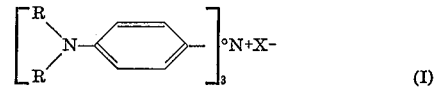

(I)

wherein R is a lower alkyl group of from one to five carbon atoms, particularly methyl and ethyl, and X⁻ is an anion.

Also as shown therein, the aminium salts of Formula I may be prepared in acetone solution by reacting therein the corresponding tris(p-dialkylaminophenyl)amine with a silver salt of a suitable acid. R in (I) may be any lower alkyl of from one to about five carbons.

Although both R's of (I) are shown above as identical, this is not an essential limitation. Moreover, the alkyls in each of the three p-dialkylaminophenyl groups may differ, as for example in bis(p-dimethylaminophenyl) (p-diethylaminophenyl)aminium perchlorate.

Suitatble silver salts for use in preparing compounds of this invention may be quite widely varied. Substantially any stable silver salt may be used if it is soluble in the acetone, or other solvent medium. X⁻ in (I) will be the anion of the selected silver salt. Illustrative examples include such silver salts as the picrate, benzenesulfonate, ethanesulfonate and the like. However, in accordance with the present invention, salts of halogen-containing acids are preferred. Such salts include, for example, the perchlorate (ClO₄⁻); hexafluoroantimonate (SbF₆⁻); hexafluoroarsenate (AsF₆⁻); fluoroborate (BF₄⁻); trichloroacetate (CCl₃COO⁻); trifluoroacetate (CF₃COO⁻) and the like.

Salts in which both R's are methyl or ethyl are typical and highly effective as eye protective agents. Accordingly, they will be taken as illustrative in the following discussion. As the carbon content of R is increased, the aminium salts of this invention tend to be more stable. Thus, in use, diethyl compounds are generally more stable than dimethyl and for this reason are preferred and tris (p-diethylaminophenyl)aminium fluoborate will be used below as typical.

THE ULTRAVIOLET RANGE

Various ultraviolet absorbent agents suitable for use in the present invention are well known in the art. Except in combination in the filter systems of this invention, the particular agent or agents per se do not constitute a part of this invention. Suitable agents include the following types by way of illustration.

(A) Various o-hydroxybenzophenones as disclosed, for example, in U.S. Patents Nos. 2,777,828; 2,853,521; 2,434,-496; 2,693,492, preferred compounds in this class including the following:

2-hydroxy-4-methoxybenzophenone
2,4-dihydroxybenzophenone
2,2-dihydroxy-4-methoxybenzophenone
2,2-dihydroxy-4-octyloxybenzophenone
2,2,4-trihydroxybenzophenone
2-hydroxy-4-octyloxybenzophenone
2-hydroxy-4-butoxybenzophenone
dibenzoylresorcinol
2'-carboxy-2-hydroxy-4-methoxybenzophenone
2',4'-dichloro-2-hydroxy-4-methoxybenzophenone and
4'-chloro-2-hydroxy-4-methoxybenzophenone.

(B) o-hydroxyphenylbenzotriazole derivatives, such for example as disclosed in Belgian Patent No. 563,210. Preferred compounds of this class being 2-(2-hydroxy-5-methylphenyl)benzotriazole
2-(2-hydroxy-5-t-butylphenyl)benzotriazole
2-(2-hydroxy-5-t-octylphenyl)benzotriazole
2-(2-hydroxy-4-methoxyphenyl)benzotriazole and
2-(2-hydroxy-5-chlorophenyl)benzotriazole.

(C) salicylic acid esters such as methyl salicylate
phenyl salicylate
p-butylphenyl salicylate
p-t-octylphenyl salicylate and
aryl beta-resorcylates.

(D) substituted acrylonitriles such as 3,3-diphenyl-3-carbethoxyacrylonitrile and
3-(4-methoxyphenyl)-2-carbethoxyacrylonitrile.

(E) substituted arylaminoethylenes of the class exemplified by 1-cyano-1-carbethoxy-2-(N-methylanilino)-ethylene and other preferred compounds in this class including 1,1-dicyano-2-anilinoethylene
1,1-dicyano-2-(N-methylanilino)ethylene
1-cyano-1-carbethoxy-2-(N-methyl-p-methoxyanilino) ethylene
1,1-dicyano-2-anilinopropylene and
1-cyano-1-carbethoxy-2-anilinopropylene:

(F) o-hydroxyphenyltriazine derivatives, preferred compounds of this class including 2,4,6-tris(2-hydroxy-4-propoxyphenyl)-s-triazine
2-(2-hydroxyphenyl)-4,6-bis(2,4-dimethylphenyl)-s-triazine
2-(2,4-dihydroxyphenyl)-4,6-bis(2,4-dimethylphenyl)-s-triazine.
2-(2-hydroxyphenyl)-4,6-bis(4-methoxyphenyl)-s-triazine and
2-(2-hydroxyphenyl)-4,6-bis(2,4-dimethoxyphenyl)-s-triazine; and (G) nitrilohydrazone derivates, preferred compounds of this class including (2-methoxyphenylhydrazono)malononitrile
(4-methoxyphenylhydrazono)malononitrile
(3-methoxyphenylhydrazono)malononitrile
(2-naphthylhydrazono)malononitrile
(4-chlorophenylhydrazono)malononitrile
ethylester of cyano(phenylhydrazono)-acetic acid.

THE VISIBLE RANGE

Certain types of dyes or combinations of dyes are used in combination with the ultraviolet and infrared absorbing materials to achieve the desired transmittance in the visible range. Thus, by the use of proper materials, an optical filter system may be "tailored" to fulfill light transmittance requirements.

To control transmittance in the visible portion of the spectrum, suitable dyes have been used in the past with various plastic substrates discussed above. As is well known in the art, alone or in combination, various types of dyes may be used in small amounts to adjust transmittance in the visible range. Such dyes should be light fast and also compatible with all the other materials in the plastic substrate system. Especially useful for such purposes are oil-soluble dyes of the anthraquinone type such as various substituted amino anthraquinone. The present invention is not concerned with the use of any particular dye and substrate combination in the absence of suitable ultraviolet and infrared protective agents.

It is not readily possible to assign limits to the amount of each additive which it is desirable to use. In general, both the maximum and minimum concentration depend on the desired protection and whether the additives are disseminated uniformly through the substrate or are concentrated in a barrier layer of the same or a different substrate. To achieve the desired optical filter system, the plastic substrate chosen may be in various thicknesses; thus, if a thin sheet is used, higher concentrations of the absorbing material or materials are required; with thicker layers or sheets lower concentrations are required.

In preparing the optical filter, it is possible to use only a single plastic layer; or two plastic layers containing the same or different organic absorbing components may be used, for example, as a laminate. For protection against abrasion, and the like, the plastic layers may be sandwiched between layers of glass. In addition, a glass substrate may be coated with a layer or film of organic material containing the absorbing substances in the proper concentration.

In use, the absorbing agents of the present invention may be incorporated in any suitable plastic or applied on suitable transparent substrates of plastic or glass. This is done by and of several known procedures, including for example: solution casting or dipping; hot milling; burnishing; or by dyeing. Organic plastic material containing the aminium salts can be molded into formed articles such as sheets and plates.

In any method of use, the compounds may be incorporated as a barrier layer in or near one surface of a substrate or be disseminated therethrough. Choice of either practice depends on the type of protection used and the physical method used to combine the substrate and the additives.

Either practice can be used to protect the treated material. Either can also be used to form a protective barrier between an object to be protected and the source of the infrared radiation. In the latter case, protection is usually provided by combining additives and organic substrate in a relatively thin layer or sheet which is then used as the protective barrier. Protection of an object also can be obtained by coating the compounds, in a suitable vehicle, directly onto substrates such as glass or formed plastic objects whether to protect the substrate or in forming a protective barrier for other objects.

The invention will be further illustrated in conjunction with the following specific examples which are intended for that purpose only. Therein, unless otherwise noted, all parts and percentages are by weight and all temperatures are expressed in degrees centigrade.

In the following examples the milling and molding procedure used was as follows. The additives were mixed with the required weight of semi-molten plastic on a two-roll laboratory mill heated to about 170° C. (front roll at 180° C. and back roll, 160° C.). The required small amounts of dye were added as aliquots from previously milled batches of plastic. Mixing was effected by continuously stripping off the material and passing it between the rolls for about 20 to 40 times. The dyes and ultraviolet absorber were added first, followed by about 40 milling passes. The infrared absorber then was added, followed by about 20 passes.

A portion of the resulting thick mass was then hot compression molded into a smooth transparent plate. The molding conditions were as follows: temperature, 170° C.; sample preheated for five minutes with no pressure; 20 tons force applied on a 4 x 5 inch sample for about three minutes while hot and for about five minutes while cooling.

Similarly, in the following discussion, examples and tables, various infrared absorbers, ultraviolet absorbers and dyes are used. In each case the chemical nomenclature is quite long and involved. Accordingly, in the subsequent discussion, the following symbols will be used for purposes of simplifying identification of these materials when reference is made thereto.

INFRARED ABSORBERS

IR-1 = tris(p-diethylaminophenyl)aminium fluoborate
IR-2 = 1,1,7,7-tetrakis(p-dimethylaminophenyl)-trivinylcarbonium perchlorate,
IR-3 = 1,7-bis(p-dimethylaminophenyl)-1,7-diphenyl-trivinylcarbonium perchlorate IR-4=bis(xanthene)heptamethine perchlorate
IR-5=bis(3,6-dimethoxyxanthene)heptamethine perchlorate
IR-6=tris(p-diethylaminophenyl)aminium hexafluoroarsenate

ULTRAVIOLET ABSORBERS

UV-1=2,2'-dihydroxy-4-methoxybenzophenone
UV-2=carbonyl cyanide, m-methoxyphenylhydrazone

DYES

Dye No. 1=C.I. Solvent Violet 13, C.I. 60725
Dye No. 2=1,4-bis(ethylamino)anthraquinone
Dye No. 3=C.I. Solvent Red 26, C.I. 26120
Dye No. 4=Solvent Black—an oil-soluble mixture of C.I. Solvent Green (C.I. 61565); Dye No. 1 and Dye No. 3 in weight ratio 6:5.1.

Examples 1-5

Transparent chips or panels of polymethyl methacrylate are prepared by hot roll milling and hot compression molding processes. In the compositions, varying amounts of infrared absorber, ultraviolet absorber and dye are incorporated as shown in the following Table III.

Figure 2:
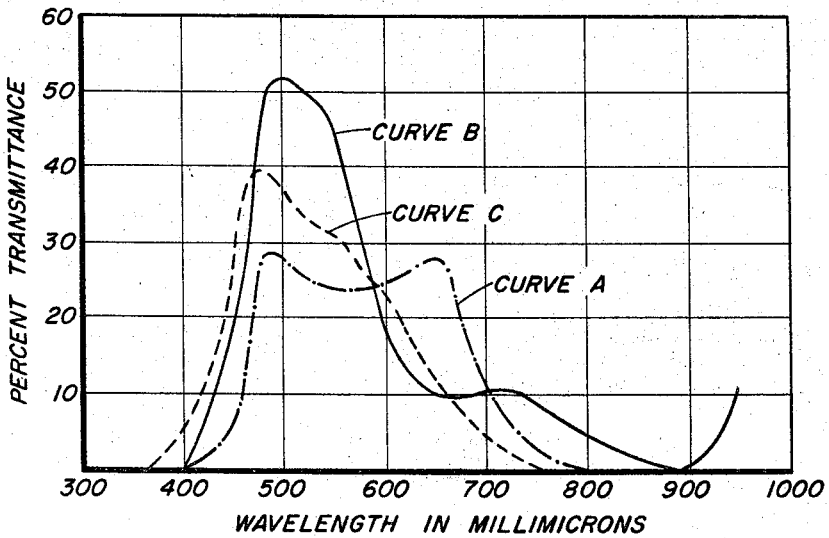
Figure 3:
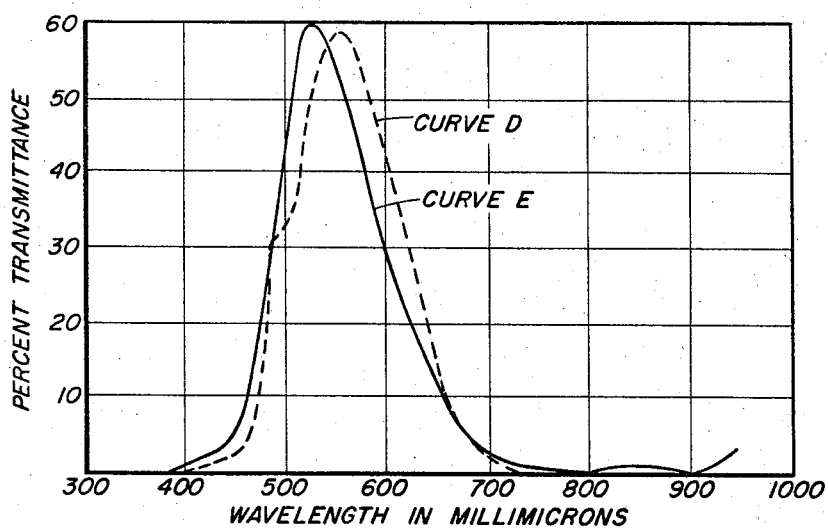
Figure 4:
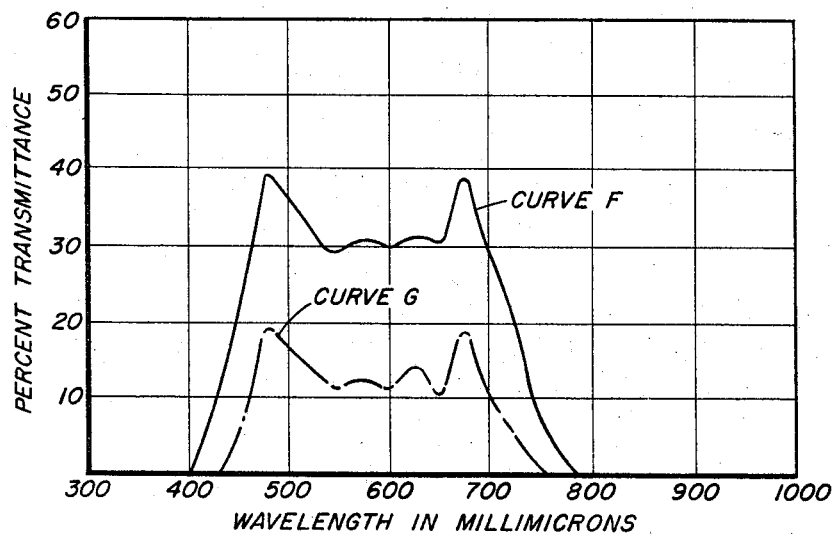

The samples so prepared are tested to ascertain the percent transmittance at various wavelengths. Illustrative results are shown below in Table III. Plots of the transmittance curves in Examples 1-3 are shown in FIG. 2 as curves A, B and C respectively, those of Examples 4-5 in FIG. 3 as curves D and E, respectively.

Example 8

To illustrate the use of the present invention in a glass-plastic-glass laminate, a solution of IR-1 in acetone (1.5 g./100 ml.) is formed and poured into about ten volume of benzene. Into the resultant solution, washed and dried pieces of polyvinyl butyral sheeting of 15 mils thickness are placed and held for about 30 minutes. So-treated samples are then transferred into about an equal volume of benzene containing about 30 mg./100 ml. of Dye No. 1 and held therein for about fifteen minutes. So-treated samples are removed, rinsed in benzene and placed in about an equal volume of a solution of UV-1 in benzene (about 300 mg./100 ml.) for thirty minutes. Samples are removed, excess solvent is padded off with clean, dry cotton cloth and the samples placed in an oven at about 50° C. for 2 hours. Resultant samples are then placed between glass sheets, together with brass shims of 12-14 mils thickness and pressed together with a steam-heated press at 300° F., therein preheated for three minutes with no pressure, followed by pressing at about 500 lb./sq. in. for one minute while hot and for five minutes while cooling. Resultant plastic interlayer has about the following content: IR-1, about 1%; UV-1, about 1.3% and Dye No. 1, about 0.008%.

Percent transmittance at various wavelengths is given

TABLE III.—PERCENT TRANSMITTANCE AT PARTICULAR WAVELENGTHS

| Example [1] No. | Composition and Thickness of Panel | Wavelength (millimicrons) | | | | | | | | | | | |
|---|---|---|---|---|---|---|---|---|---|---|---|---|---|
| | | 400 | 450 | 480 | 500 | 550 | 600 | 650 | 700 | 750 | 800 | 850 | 900 | 950 |
| 1 | IR-1 0.1%, UV-1 0.2%, Dye No. 1 0.0051%, 75 mils | 0 | 5 | 28.4 | 27.8 | 23.2 | 24.0 | 27.7 | 11.0 | 1.0 | 0 | 0 | 0 | 0 |
| 2 | IR-2 0.007%, UV-2 0.20%, 67 mils | 0 | 18.5 | 46.5 | 51 | 46 | 19 | 10 | 10.2 | 9.5 | 4.6 | 1.5 | <1 | 11 |
| 3 | IR-3 0.014%, UV-1 0.2%, 73 mils | 4 | 22 | 39 | 37 | 31 | 23 | 11.5 | 3.4 | 0 | 0 | 0 | 0 | 0 |
| 4 | IR-4 0.024%, UV-2 0.26%, 67 mils | 0 | 2 | 29 | 32 | 59.5 | 41.5 | 11.5 | 1.0 | 0 | 0 | 0 | 0 | 6.0 |
| 5 | IR-5 0.017%, UV-1 0.36%, 73 mils | 1 | 4.6 | 29 | 42 | 55 | 28 | 11 | 2.5 | 1.0 | <1 | 1.2 | 1.0 | 4 |

[1] All percentages are based on the polymethyl methacrylate.

In general, varying the thickness of a substrate without varying the concentration of the protective agents does effect the transmittance. In general, the major effect is to alter the total transmittance. In other words, the general profile of the transmittance curve does not change radically, only its relative height when plotted on the same basis. This is illustrated in the following examples.

Examples 6 and 7

Using the procedure and substrate of Example 1, acrylate resin substrate, sample panels of 61 mils and 116 mils thickness, respectively, are prepared using I.R.-6 U.V.-1 and Dyes 1, 2 and 3. The composition and transmittance characteristics are shown in the following table, Table IV. Transmittance characteristics are also shown as curves F and G, respectively, in FIGURE 4.

TABLE IV

| Composition | |
|---|---|
| Additive | Concentration [1] |
| I.R.-6 | 0.05 |
| U.V.-1 | 0.5 |
| Dye No. 1 | 0.002 |
| Dye No. 2 | 0.003 |
| Dye No. 3 | 0.0015 |

| Wavelength (millimicrons) | Percent Transmittance | |
|---|---|---|
| | Ex. 6 | Ex. 7 |
| 400 | 0 | 0 |
| 450 | 20 | 3.5 |
| 480 | 39 | 19 |
| 500 | 37 | 17 |
| 550 | 29 | 12 |
| 600 | 31 | 12 |
| 650 | 31 | 11 |
| 700 | 30 | 11 |
| 750 | 8.5 | 1.2 |
| 800-1,050 | 0 | 0 |

Figure 5:
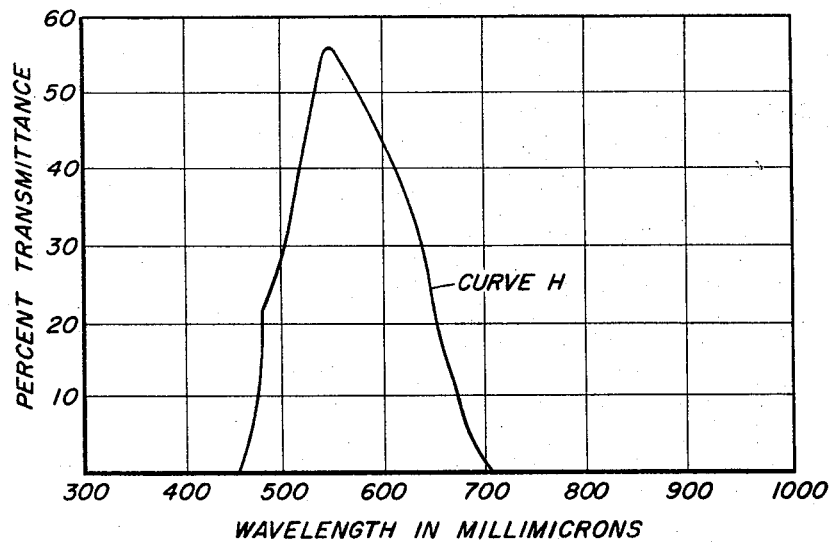

[1] Weight percent.

below in Table V and the transmittance characteristics are represented by curve H in FIG. 5.

TABLE V

| Wavelength ([1]) | Percent transmittance |
|---|---|
| 400 | 0 |
| 450 | 0 |
| 480 | 22.5 |
| 500 | 28 |
| 550 | 56 |
| 600 | 45 |
| 650 | 20 |
| 700 | 0.5 |
| 750 | 0 |
| 800-1050 | 0 |

[1] Millimicrons.

Examples 9 and 10

Using the procedure of Example 1 and a polymethyl methacrylate resin substrate, sample panels of 70 mils thickness are prepared; using 0.2 percent of the IR-1 alone (Ex. 9) and 0.2 percent each of IR-1 and UV-1 (Ex. 10). Light transmittance properties of the resultant panels are measured at various wavelengths before and after twelve weeks exposure to direct summer sunlight. Illustrative results are shown in the following Table VI. Therein $T^1$ and $T^2$ represent the percent transmittance at the various wavelengths before and after exposure, respectively. Using maximum transmittance at about 500 millimicrons as representative, it is notable that in Ex. 9 31% of the original transmittance is lost, whereas in Ex. 10 the loss is only 19%, clearly showing the stabilizing effect of the UV-absorber.

TABLE VI

| Wavelength (milli-microns) | Percent Transmittance | | | |
|---|---|---|---|---|
| | Ex. 9 | | Ex. 10 | |
| | $T^1$ | T | $T^1$ | T |
| 400 | 0 | 0 | 0 | 0 |
| 450 | 0 | 0 | 0 | 0 |
| 480 | 23 | 15 | 25 | 21 |
| 500 | 28 | 19 | 28 | 26 |
| 550 | 48 | 33 | 57 | 46 |
| 600 | 37 | 27 | 40 | 35 |
| 650 | 15 | 12 | 15 | 12 |
| 700 | 1 | 1 | 1 | 0 |
| 750 | 0 | 0 | 0 | 0 |
| 800 | 0 | 0 | 0 | 0 |
| 800-1050 | 0 | 0 | 0 | 0 |

Examples 11–13

Using the procedure and substrate of Example 1, panels of about 70 mils thickness are prepared, each containing 0.0046% of Dye No. 1; 0.003% each of Dye No. 2 and Dye No. 4; and 0.13% of IR-1. One set (Ex. 11) contains no UV-absorber; one set (Ex. 12) 0.2% of UV-1; and one set (Ex. 13) 0.2% of UV-2. Transmittance characteristics are measured as in Ex. 9. Illustrative results are shown in the following Table VII wherein $T^1$ and $T^2$, respectively, again represent the values before and after exposure.

TABLE VII

| Wavelength (milli-microns) | Percent Transmittance | | | | | |
|---|---|---|---|---|---|---|
| | Ex. 11 | | Ex. 12 | | Ex. 13 | |
| | $T^1$ | $T^2$ | $T^1$ | $T^2$ | $T^1$ | $T^2$ |
| 400 | 0 | 0 | 0 | 0 | 0 | 0 |
| 450 | 0 | 2 | 0 | 1 | 0 | 0 |
| 480 | 24 | 10 | 28 | 22 | 26 | 25 |
| 500 | 23 | 11 | 28 | 22 | 27 | 26 |
| 550 | 16 | 8 | 21 | 17 | 21 | 20 |
| 600 | 10 | 5 | 15 | 11 | 16 | 15 |
| 650 | 11 | 8 | 14 | 10 | 17 | 16 |
| 700 | 10.5 | 12 | 6 | 5 | 13 | 12 |
| 750 | 1.5 | 3 | 0 | 1.5 | 1.5 | 1 |
| 800 | 0 | 0 | 0 | 0 | 0 | 0 |
| 800-1050 | 0 | 0 | 0 | 0 | 0 | 0 |

Again the stabilizing effect of the UV-absorber is clearly seen, loss of transmittance at 480 millimicrons being only 21% (Ex. 12) and 4% (Ex. 13) as compared with 58% when no UV-absorber is used (Ex. 11).

Examples 14 and 15

Using cellulose acetate as the substrate, the procedure of Examples 9 and 10 are repeated. The formulations and illustrative results as measured at 550 millimicrons are shown in the following Table VIII. Therein $T^1$ and $T^2$ again represent percent transmittance before and after exposure, respectively. The loss of transmittance in Ex. 14 is 47.5% of the original transmittance, whereas in Ex. 15 the loss is only 23.2%.

TABLE VIII

| Additive in Formulation | Content, Percent | |
|---|---|---|
| | Ex. 14 | Ex. 15 |
| IR-1 | 0.1 | 0.1 |
| UV-1 | | 0.2 |
| Dye No. 1 | 0.005 | 0.005 |
| Thickness (mils) | 60 | 65 |
| $T^1$ at 550 m$\mu$ | 36 | 21.5 |
| $T^2$ at 550 m$\mu$ | 18.9 | 16.5 |

We claim:
1. An optical filter comprising an organic plastic substrate having dispersed therein an organic infrared absorber which is a tris(p-dialkylaminophenyl)aminium salt and an organic ultraviolet absorber selected from the group consisting of o-hydroxybenzophenones, o-hydroxyphenylbenzotriazoles, salicylic acid esters, substituted acrylonitriles, substituted arylaminoethylenes, o-hydroxyphenyltriazines, and nitrilohydrazones; the individual members of each group and the relative proportions thereof being selected so that the filter is characterized by transmittance of radiant energy at various wavelengths in the following ranges:
from 300 to 400 millimicrons, below about 5%;
from 400 to 480 millimicrons, below about 40%;
from 480 to 650 millimicrons, between about 10% and about 60%;
from 650 to 750 millimicrons, below about 40%; and
from 750 to about 950 millimicrons, below about 10%.

2. An optical filter according to claim 1 wherein the infrared absorber is a tris(p-dialkylaminophenyl) aminium salt and the ultraviolet absorber is an o-hydroxybenzophenone.

3. A filter according to claim 2 wherein the substrate also contains an aminoanthraquinone dye.

4. An optical filter according to claim 2 wherein said infrared absorber is tris(p-diethylaminophenyl) aminium fluoborate and said ultraviolet absorber is 2,2'-dihydroxy-4-methoxybenzophenone.

5. A filter according to claim 4 wherein the substrate also contains an aminoanthraquinone dye.

References Cited

UNITED STATES PATENTS

| 2,011,428 | 8/1935 | Voorhees | 252—300 X |
| 2,976,259 | 3/1961 | Hardy et al. | 252—300 X |
| 2,992,938 | 7/1961 | McCarville et al. | 252—300 X |

LEON D. ROSDOL, *Primary Examiner.*

RICHARD D. LOVERING, *Assistant Examiner.*